F. R. JAMES & A. C. THOMPSON.
EGG PRESERVING APPARATUS.
APPLICATION FILED MAY 4, 1911.

1,019,048.

Patented Mar. 5, 1912.

Witnesses:
Ivan Konigsberg
K. G. Leard

Frederick Reesor James   Inventors.
Alan Cameron Thompson
By their Attorney

UNITED STATES PATENT OFFICE.

FREDERICK REESOR JAMES AND ALAN CAMERON THOMPSON, OF TORONTO, ONTARIO, CANADA, ASSIGNORS OF THREE-EIGHTHS TO SAID JAMES, THREE-EIGHTHS TO SAID THOMPSON, AND ONE-FOURTH TO THOMAS ALLATT, OF TORONTO, CANADA.

EGG-PRESERVING APPARATUS.

1,019,048.     Specification of Letters Patent.     Patented Mar. 5, 1912.

Application filed May 4, 1911. Serial No. 624,912.

*To all whom it may concern:*

Be it known that we, FREDERICK REESOR JAMES and ALAN CAMERON THOMPSON, subjects of the King of Great Britain, both residing at Toronto, in the Province of Ontario, Dominion of Canada, have invented a new and useful Improvement in Egg-Preserving Apparatus, of which the following is a specification.

This invention relates to a portable egg preserving apparatus and has as its objects the provision of readily operable means for the evacuation of air or other gas from within the egg-shell and the subsequent sealing of the shell against the readmission of air or other gas or fluid.

In the following we have described, in connection with the accompanying drawings, one means of carrying out the objects of our invention, the features thereof being more particularly pointed out hereinafter in the claims.

Figure 1:
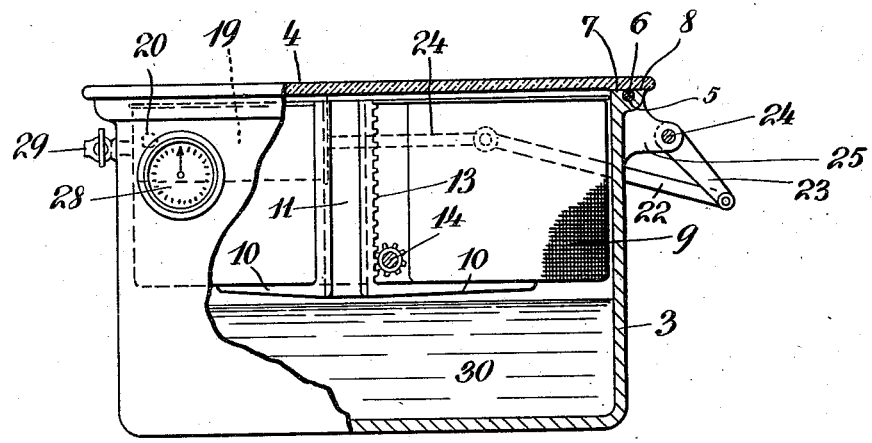
Figure 2:
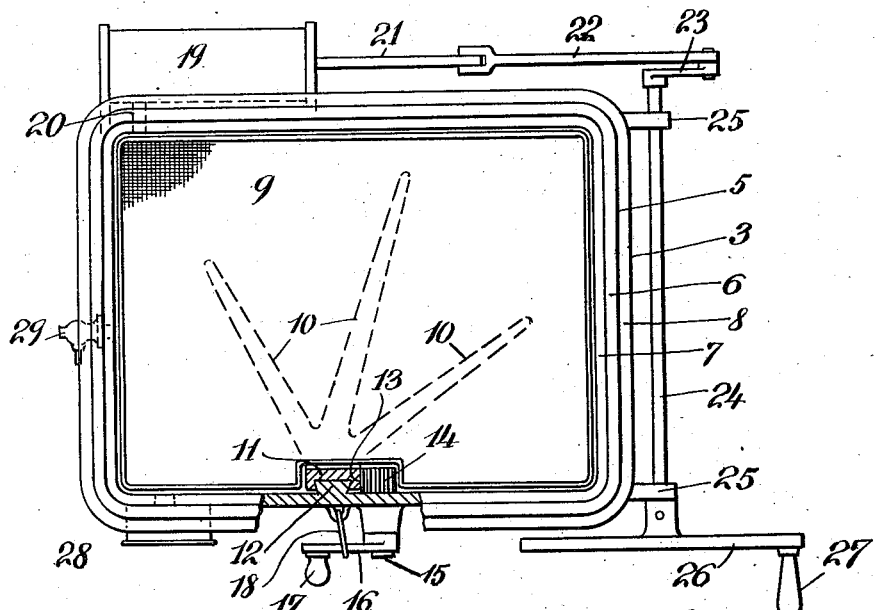

In the drawings Figure 1 is a side elevation, partly broken away, of a structure illustrating one mode of carrying out our invention and Fig. 2 is a plan view of the same, partly broken away, and with the cover removed.

Like numerals of reference indicate like parts throughout the several views.

In the drawings 3 indicates a receptacle of any suitable size, shape or material, preferably rectangular and made of a metal, such as cast iron. It is important that the receptacle, when closed by a cover 4, should be air-tight and to this end we have shown the upper edge of the receptacle 3 as provided with a seat 5 for a gasket or packing 6, preferably of rubber. The parts may be so proportioned that when the cover is in place and the air exhausted from the receptacle, by the means herein described, the under surface of the cover will contact with and rest against the upper edge 7 of receptacle 3 and the outer edge 8 of the seat 5. The cover 4 may be made of glass so as to permit ready observation of the interior of the receptacle.

9 indicates an inner receptacle or basket, preferably of wire, open at the top to receive the charge of eggs and supported on fingers 10, 10, 10, on an arm 11 adapted to vertical movement on a guide 12. One side of arm 11 is provided with a rack 13 meshing with a pinion 14 on shaft 15 projecting through the wall of receptacle 3 and provided with a suitable stuffing box (not shown) to provide against the admission of air around said shaft.

16 is a crank arm on the outer end of shaft 15 and 17 a handle on the crank arm.

18 is a latch for holding the crank arm from movement when so desired.

19 indicates a vacuum pump by means of which the air may be exhausted from the interior of receptacle 3 through a suitable opening 20. The pump is operated by a rod 21, connected by means of a link 22 with a crank arm 23 on operating shaft 24 having bearings 25, 25, on the body of receptacle 3. Shaft 24 is adapted to be rotated by a crank arm 26 provided with a handle 27.

28 indicates a vacuum gage and 29 a valve controlling the admission of air into receptacle 3.

30 indicates a suitable sealing material, such as wax, adapted to be kept hot, if necessary, by any suitable heating means (not shown) such as a lamp or gas burner.

In the operation of the device the wax or other sealing material is placed in the bottom of the receptacle and the eggs to be evacuated and sealed are placed in basket 9. Valve 29 is closed, cover 4 is put in place and the air exhausted by means of pump 19. When gage 28 indicates that substantially all the air has been exhausted, the basket is lowered, while the vacuum pressure is still maintained, into the molten wax, or other sealing fluid, previously heated, if necessary, until the eggs in the basket are entirely submerged in the sealing fluid. The valve 29 is then opened. The release of the vacuum pressure and the admission of air into the receptacle 3 result in subjecting the sealing fluid to substantially atmospheric pressure which drives or forces the sealing fluid into the pores of the egg-shell, thus assisting in preserving the same and preventing the readmission of air or other gas into the egg after the same has been removed from the sealing fluid bath. The eggs may then be raised out of the sealing fluid, the cover 4 removed and the basket 9 taken from the receptacle and the eggs dried. They are then ready for storing.

Eggs treated in the manner described will keep for months without any impairment of their freshness.

The apparatus itself is simple, compact and easily operable.

Where we use the term "basket" in the claims it is intended to be descriptive of any suitable form of egg receiving receptacle.

Where we refer to submerging the eggs in the sealing fluid, of course the eggs may be submerged as described or the sealing fluid may be moved to cover the eggs, the latter in this case being held stationary, the essential feature being to bring the eggs in contact with the sealing fluid while in vacuum.

It is obvious that the details of the apparatus as described may be widely varied without departing from the scope of the invention and we do not restrict ourselves to such details further than the scope of the appended claims demand.

What we claim and desire to secure by Letters Patent is:

1. An egg preserving apparatus comprising an air-tight receptacle, a vacuum pump in connection therewith, an air inlet, an egg retainer, and means for causing a relative vertical movement of said receptacle and retainer with reference to each other.

2. An egg preserving apparatus comprising an air-tight receptacle, a vacuum pump in connection therewith, an air inlet, an egg retainer and means for causing a relative vertical movement of said receptacle and retainer with reference to each other while maintaining the vacuum.

3. An egg preserving apparatus comprising an air-tight receptacle, a vacuum pump in connection therewith, an air inlet, a basket within said receptacle, and means for moving said basket vertically within said receptacle.

4. An egg preserving apparatus comprising a receptacle, a cover therefor, a yielding support for said cover, a seat against which said cover is adapted to rest, a vacuum pump in connection with said receptacle, an air inlet, a basket within said receptacle, and means for moving said basket vertically within said receptacle.

5. An egg preserving apparatus comprising an air-tight receptacle, a vacuum pump in connection therewith, an air inlet, a basket within said receptacle, fingers supporting said basket, an arm supporting said fingers, a rack on said arm, a pinion in mesh with said rack, and means for rotating said pinion.

6. An egg preserving apparatus comprising a receptacle, a transparent glass cover therefor, a support for said cover, means for causing an air-tight closure of said cover and receptacle, a vacuum pump in connection with said receptacle, an air inlet, a basket in said receptacle, and means for moving said basket vertically.

7. An egg preserving apparatus comprising an air-tight receptacle, means for creating a substantial vacuum therein, an air inlet, a basket within said receptacle and means for lowering said basket while maintaining said vacuum.

8. An egg preserving apparatus comprising an air-tight receptacle, a vacuum pump in connection therewith, an air inlet, a basket within said receptacle, fingers supporting said basket, an arm supporting said fingers, a rack on said arm, a pinion in mesh with said rack, means for rotating said pinion, and means for holding said rotating means in fixed position.

In witness whereof we have hereunto signed our respective names in the presence of two subscribing witnesses.

FREDERICK REESOR JAMES.
ALAN CAMERON THOMPSON.

Witnesses:
SEABURY C. MASTICK,
K. G. LEARD.

---

Copies of this patent may be obtained for five cents each, by addressing the "Commissioner of Patents, Washington, D. C."